United States Patent

[11] 3,619,294

[72] Inventors William C. Black
 Cedar Rapids;
 Otto J. Rajtora, Iowa City, both of Iowa
[21] Appl. No. 744,642
[22] Filed July 15, 1968
[45] Patented Nov. 9, 1971
[73] Assignee Penick & Ford Limited
 Cedar Rapids, Iowa

[54] METHOD OF COMBINING CRYSTALLINE SUGAR WITH IMPREGNATING AGENTS AND PRODUCTS PRODUCED THEREBY
15 Claims, No Drawings

[52] U.S. Cl................................................. 127/30,
 18/79, 99/78, 99/134 R, 99/140 R, 99/148 R,
 99/DIG. 4, 127/29, 127/63, 424/361
[51] Int. Cl............................................. C13k 1/00
[50] Field of Search............................................ 99/140;
 424/361; 127/30, 63

[56] References Cited
UNITED STATES PATENTS
| 1,902,773 | 3/1933 | Hale | 127/30 |
| 2,949,401 | 8/1960 | Wershaw | 424/361 |
| 3,293,133 | 12/1966 | Hill | 424/361 |
| 3,347,682 | 10/1967 | Rosenstein | 424/361 |

FOREIGN PATENTS
| 508,602 | 6/1955 | Italy | |

OTHER REFERENCES
Chemical Abstracts: 53, 606 i (1959)
A. Lachmann, Food Engineering, 38, 140, 143, 145, (May 1966.)

Primary Examiner—Joseph Scovronek
Assistant Examiner—Sidney Marantz
Attorney—Dawson, Tilton, Fallon and Lungmus ABSTRACT: Massecuite Aggregated Microcrystalline Sugar granules (structurally comprising cohered sugar microcrystals with internal capillary networks) are employed as a means to combine crystalline sugar with solid or liquid modifying agents which are dissolved (or otherwise dispersed) in an aqueous or organic solvent carrier, which is sprayed (or otherwise applied) onto a bed of the granules while they are being agitated and intermixed. The liquid carrier and modifying agent are absorbed into the granules to achieve internal impregnation thereof. Where the liquid carrier is relatively volatile compared to the modifying agent, as when the added substance is normally a solid, the carrier can be evaporated leaving the added substance within the granules. Either with or without removal (viz by evaporation or drying) of the liquid carrier, the impregnated granules can be subjected to a second treatment in which a pore closure material is applied to reduce the porosity of the surface layers of the granules, and thereby at least partially seal off the impregnated agent from escape to or contact with the atmosphere. Alternatively, the impregnated granules without drying and/or subjected to a second treatment can be packaged in sealed containers.

METHOD OF COMBINING CRYSTALLINE SUGAR WITH IMPREGNATING AGENTS AND PRODUCTS PRODUCED THEREBY

BACKGROUND

In recent years, a new process has been developed for preparing free-flowing sugar granules from crystallizable sugars. The process is particularly applicable to the manufacture of granular dextrose products from starch hydrolysates of high D.E., which are referred to as "Total Sugar" products, since they are composed of dextrose in admixture with the residual oligosaccharides of the saccharification. However, the process is also applicable to sucrose, and, in fact, to any other crystallizable sugar. The details of the process are set out in copending application Ser. No. 674,168, filed Oct. 10, 1967, entitled "Novel Granular Sugar Products and Process for Producing."

The process of the cited application has sometimes been referred to as "Spray Crystallization." However, the product produced by the process can perhaps more accurately be described as "Spray-Drier Aggregated" granules (herein after "SDA" granules). The crystallization takes place primarily before and after the spray drying step. In addition to removing a substantial quantity of water, one of the functions of the spray drying is to form the basic aggregate structure, the granular aggregates thus obtained being subsequently aged and dried to complete the granulation process.

More specifically, in the process of the cited application, a water solution of a crystallizable sugar is subjected to partial crystallization to form a pumpable massecuite composed essentially of microcrystals of sugar dispersed in a saturated water solution of sugar. This massecuite, which may contain from 40 to 60 percent of the sugar in crystalline form, is sprayed into a drying air stream to form atomized droplets and to remove part of the water from the droplets in the air stream to form granular aggregates of the microcrystals containing residual crystallizable sugar solution. Essentially each droplet forms a single aggregate of generally spherical shape. This step is preferably carried out in a spray dryer tower where the massecuite droplets are formed at the top and fall downwardly through the tower with the evaporation of water therefrom. Where the hydrate crystal form is critical, as with the conversion of dextrose to dextrose monohydrate crystals, the spray dryer is operated at a sufficiently low temperature to avoid formation of anhydrous dextrose or other unstable crystal forms. For example, the massecuite droplets during spray drying of a starch hydrolysate can be kept below 50° C. With sucrose and other sugars, the spray drying temperature can be varied over a wider range, especially where the sugar has only one crystalline form, such as with sucrose which forms only anhydrous crystals.

The granular crystalline material produced by the spray aggregation process just described, will contain additional crystallizable sugar, which may be in the form of a supersaturated solution that will rapidly crystallize. However, the granules obtained from the spray dryer have sufficient structural integrity to permit them to be transferred to other processing apparatus for completion of the crystallization. This further processing can include an aging procedure in which crystallization is continued with or without removal of additional water. As a final step, however, it is desirable to subject the granular aggregates to drying to force completion of the crystallization, and at the same time to reduce the free water content to a very low level. Where part of the water combines with the sugar as it crystallizes, free water is eliminated in this way as well as by evaporation. The free water content of the final granular products will usually be below 1 percent by weight, and may be as low as 0.5 percent or lower. Where the granular product is formed principally of dextrose monohydrate, overdrying can convert some of the monohydrate crystals to anhydrous crystals, which may be undesirable unless a product comprising a mixture of monohydrate and anhydrous crystals is desired.

It has been proposed to incorporate modifying agents, such as synthetic sweetening agents, edible organic acids, and food flavoring substances in a spray drier aggregated sugar product by dispersing the modifying agent or additive in the massecuite before spraying. The application of this procedure is limited, however, and it has certain inherent disadvantages. Obviously, the additive cannot be of a kind or added in such a quantity as to interfere with the completion of the crystallization of the sugar during and after spray drying. An even more serious disadvantage is that the additive will necessarily contaminate the massecuite mixing, pumping, and spraying apparatus. Consequently, after producing a product containing a particular additive, it would be necessary to thoroughly clean all of the apparatus contacted with the additive before resuming production of an unmodified crystalline product, or a product containing a different additive. Since for satisfactory production operation, the spray drier apparatus must be of very large size and capacity, shutdown time for cleaning, even if thorough cleaning can be made feasible, is highly objectionable and increases overall operating costs in relation to volume of production. Another disadvantage of such an addition to the massecuite is that in the extensive contact of each granule or aggregate with warm air, as necessary to effect water removal in the spray tower, a significant amount of undesirable oxidation and/or loss of additive due to volatilization may occur.

SUMMARY

The present invention involves the discovery that the Spray-Drier Aggregated granules (or their equivalent as herein after described) have substantial internal free volume, comprising an internal capillary network, which extends from the outer surfaces of the granules into the interior thereof, and that this permits a substance, such as an additive or modifying agent, to be introduced in a liquid carrier, the carrier being rapidly absorbed into the granules. Although the granules have a high degree of porosity, the coherence between the microcrystals permits even an aqueous carrier to be absorbed into the capillary network of the granule to achieve a substantial impregnation of the granule without changing its form. Further, the absorption of water or other carrier from the surface of the granules as applied takes place so rapidly that the ordinary tendency of a granular sugar product to cake, pack or agglomerate when wet can be readily controlled by simple agitation and intermixing of the granules.

In one method of practicing the present invention, the SDA granules, which are free-flowing and porous, are formed into a bed, such as a bed or mass of granules in a suitable mixing apparatus. A liquid dispersion of the additive or modifying agent is sprayed or otherwise distributed on the bed of the sugar granules while agitating and intermixing the bed. The dispersion can be applied at a rate facilitating rapid absorption of the dispersion from the outer surfaces of the granules into the interiors thereof, and the agitation and intermixing is controlled to prevent caking or packing, the granules remaining discrete and free-flowing without intergranule agglomeration occurring to any appreciable extent.

When the impregnation of the granules has been completed, they can be further processed in various ways, as will be disclosed in the following detailed specification. It will be understood that these additional steps form a part of certain preferred embodiments of the present invention.

DETAILED DESCRIPTION

Where the granular starting material has been prepared by the process of the cited copending application Ser. No. 674,168, the material will comprise generally spherical granules of crystalline sugar, and the granules will be formed essentially of aggregates of microcrystals of the sugar, such as microcrystals of dextrose monohydrate, microcrystals of sucrose, etc. The average granular size can range from 100 to 400 microns, such as an average size about of 200-300 microns. This granular size can be varied by screening and/or milling or crushing the granular product, but exact granule sizing is not essential for the purposes of the present precess.

The granular starting material will usually contain less than 1 percent free moisture, and preferably less than 0.5 percent by weight free moisture. While granular products containing free moisture as high as 2 or 3 percent can be used, such higher moisture contents tend to limit the obtainable impregnation at least in the initial cycle, and therefore it is preferred to utilize a starting material which contains little or no free water.

As used in the present application, the terms "Spray-Drier Aggregated" or "SDA" mean sugar granules originating from individual spray-dried droplets of a sugar massecuite comprising microcrystals of sugar dispersed in a water solution thereof, additional microcrystals of the sugar having been deposited internally by removal of free water from the residual solution after the spraying of the droplets. In terms of physical structure, the SDA granules comprise cohered sugar microcrystals with internal capillary networks. Sugar granules of the same basic structure which are usable for the purpose of the present invention can also be produced by the process of copending application Ser. No. 744,958 filed on even date herewith, and entitled "Sugar Granulation Process and Products Produced Thereby." In that process a pumpable massecuite consisting of sugar microcrystals, such as dextrose or sucrose microcrystals suspended in a saturated solution of the sugar is intermixed with a bed of previously processed recirculated granular sugar, which is in the form of porous aggregated microcrystals. The mixture is then dried under conditions which contribute to the further crystallization of the sugar in solution as well as to water removal. The final product has the form of porous aggregates of cohered sugar microcrystals with internal capillary networks. If desired the particle size can be varied by crushing or grinding and sieving. The fractured granules may not be spherical and will have a somewhat more irregular shape than SDA granules, but they are still free-flowing absorbent granules, and can be used in the process of the present invention. Consequently, the terms "Massecuite Aggregated Microcrystalline Sugar" or "Mams" granules, as used herein are intended to encompass such materials, which are generally equivalent in structural properties to the SDA granules obtained by the process of the cited application Ser. No. 674,168.

Where the MAMS granules are formed from total sugar, the D.E. (dextrose equivalent) of the total sugar forming the granules is preferably at least 88. MAMS total sugar granules having a D.E. ranging from 92 to 98 are desirable. However, total sugar granules can be produced having a D.E. higher than 98 by a more complete conversion of the starch hydrolysate to dextrose. Therefore, if it is desired to employ MAMS granules which are substantially pure dextrose, the starting material for the MAMS granules can consist of a pumpable massecuite composed substantially entirely of microcrystals of dextrose dispersed in a water solution of dextrose. This massecuite can be Spray-Drier Aggregated or otherwise formed into MAMS granules, as described above. Similarly, MAMS granules can be formed from other cyrstallizable sugars, such as sucrose, fructose, maltose, lactose, xylose, mannitol, etc.

As used herein the term "aqueous carrier" is intended to refer to water or a mixture of water with a minor proportion (viz less than 50 percent) of another solvent, where the mixture still functions essentially as an aqueous carrier, that is, any additional solvent has not so modified the solvent properties of the water that the aqueous carrier is no longer a good solvent for crystalline sugar. The terms "liquid medium" or "liquid carrier" are intended to refer to both aqueous and organic solvent carrier, as well as mixtures thereof. As used herein, the terms "organic solvent medium" or "organic solvent carrier" are intended to refer to a liquid carrier formed from a single organic solvent or a mixture of organic solvents which may either be substantially anhydrous, or may contain a minor proportion (viz less than 50 percent by volume) of water.

A preferred solvent for the purpose of the present invention is water unmixed with any other solvent. However, it may be desirable to employ small amounts of an organic solvent, such as ethanol, as an aid to the dispersion of the additive or modifying agent in the water carrier. The aqueous or organic solvent carrier preferably contains the impregnating agent in a true solution. However, if the additive is normally a liquid not miscible with the carrier, it can be emulsified with the carrier, or impregnated directly where the volume to be added and viscosity do not present difficulties.

In some cases, a finely divided (colloidal) solid can be suspended in the liquid carrier and at least partially impregnated into the granules as the carrier is absorbed. Consequently, the term "dispersed" or "dispersion" is used herein to refer to the incorporation of a modifier in the carrier by forming a true solution, as well as a suspension of a colloidal solid material, or an emulsion dispersion.

In many applications of the present invention, the referred to herein as an impregnating additive, additive or modifying agent will consist of an edible material, since the resulting product will be eaten, or at least taken internally, as in the case of medicine. However, the present invention is not limited to edible applications, since the MAMS granules can serve as a carrier for a wide variety of substances, where the use of the final product may be dictated by the properties of the additive, which may or may not be edible. Among the various kinds of substances which can be incorporated in the sugar granules by the use of an aqueous carrier are synthetic sweetening agents, edible organic acids, and food flavoring substances. In addition, colors and perfumes can be incorporated, as well as sugars unlike the base sugar of the granules. By way of specific example, a concentrated fruit juice comprising an aqueous solution of sugars, flavoring substances, and color bodies, can be combined with the MAMS granules to produce a powder from which a fruit juice drink can be prepared. Flavoring oils can be incorporated as an oil-in-water emulsion, or an alcohol extract, such as the vanilla extract, can be dispersed into the aqueous carrier.

Certain organic impregnating agents, which are normally liquid, or which can be heated and applied as a liquid, can be used as their own solvent. However, in typical applications, a nontoxic organic solvent-soluble impregnating agent will be dissolved in a suitable organic solvent, and applied to the MAMS granules, preferably by spraying onto the granules while they are being agitated. Among the various kinds of substances which can be incorporated in the sugar granules by use of an organic solvent carrier are food flavoring substances, such as those commonly prepared as alcohol tinctures or extracts, colors, and perfumes. By way of specific example, a food flavoring substance, such as vanilla extract or lemon oil, can be employed to impregnate the granules.

The present invention can also be used for modifying the sweetness properties of the sugar forming the MAMS granules. For example, a concentrated water solution of a relatively sweet sugar, such as sucrose, invert sugar, or fructose, can be used to impregnate dextrose granules to thereby increase the total sweetness of the product. By a series of impregnation cycles, as will subsequently be described, from 5 to 20 percent of a supplemental sugar can be added in this way. Other sugar properties which can be provided by mixed sugars with one base sugar predominating can be readily produced by the method of this invention.

In certain applications, the MAMS granules can function as a carrier for the added substance. For example, a water dispersion of a medicinal agent can be incorporated in the granules. In this way, sticky or even normally liquid medicinal agents can be prepared in a dry granular form. The resulting granules can be filled into capsules, or they are also adapted for tableting, as described in copending application Ser. No. 744,645 filed on even date herewith, entitled "Tablets and Method of Forming." Where a flavoring agent is desired in the tablets, this can be incorporated along with the medicinal agents, and the resulting granules formed in the tablets by compression, as described in the above cited application. The impregnated granules can also be used to form candy rings or cough drops by a similar tableting or compression process. For example, a flavor such as oil of wintergreen or oil of peppermint can be emulsified in an aqueous carrier, the carrier impregnated in the granules, and thereafter the granules formed by compression into candy lozenges. Preferably, as will subsequently be described, the impregnated granules are dried to remove the water before being formed into the tablets or lozenges. This procedure is advantageous when the modifying agent is relatively nonvolatile compared to water.

When practicing the method of the present invention, it is advantageous to spray the liquid dispersion of the modifying agent onto a bed of the MAMS granules while agitating and intermixing the bed. However, other methods of application can be used. Tumble-type mixing equipment can be employed, such as a rotary mixer with internal mixing flights. An attrition-type mixer may also be advantageous. Desirably, the agitation and intermixing of the granular bed should be sufficient to effectively prevent packing or caking of the granules during spraying. The bed can be observed during the spraying operation and if any tendency to pack or cake is observed, the speed or amount of mixing can be increased. Agglomeration of the granules should not occur. Preferably, the impregnated product has approximately the same average particle size as the granular starting material.

Because of the capillary networks of the granules which extend from their outer surfaces to the interior thereof, the liquid carrier during the applications is rapidly absorbed from the surface of the granules. Apparently this prevents the exterior surfaces of the granules from becoming sticky, which would promote caking or agglomeration. The discovery that this does not occur can be explained on the basis that capillary attraction sucks the applied liquid into the interior of the granules with great rapidity, the removal of the liquid from the surface of the granules being substantially as rapid as it is applied. Thus, it is only necessary to control the rate of spraying within reasonable limits to achieve the desired impregnation without packing or agglomeration. The permissible rate of spraying is of course related to the amount of mixing, the volume of the bed, and the nature of the material being sprayed. In a particular application, the condition of the granules as the spray is applied can be observed, and if any substantial accumulation of liquid on the surface of the granules is noted, the rate of spraying can be decreased until substantially instantaneous absorption is obtained. In extreme cases an ageing or curing period may be desirable to allow further penetration and the attainment of a uniform liquid distribution.

The upper limit on the amount of spray which can be applied in one absorption cycle is the point at which the granules begin to pack or cake, becoming non-free-flowing and unmanageable in the mixing apparatus. This will usually be higher for organic solvents than for water.

In using an aqueous carrier, it will generally be preferred to keep the free water content (not including water of crystallization) of the granules below 5 percent by weight. Starting with MAMS granules containing substantially no free water (less than 0.5 percent), a suitable operating range is from 1 percent up to 4 percent free water for each impregnation cycle. If it is desired to incorporate more of the carrier for the purpose of increasing the content of the modifier, this can be done by repeated cycles. For example, the granules after the completion of the spraying step can be subjected to drying to reduce the water content, such as to a water content of less than 1 percent by weight free water, and then again subjected to a spraying operation, and so on until the desired level of the modifier is achieved. The total internal volume available for impregnation, that is the free volume of the capillary network itself, has not yet been determined with accuracy, but is appears to be substantially greater than the volume which would be occupied by adding 5 percent free water by weight.

The procedure of drying the granules after the impregnation is preferably employed where the modifying agent is substantially nonvolatile relative to water, as would be the case when the modifying agent is normally a solid, or where it is a relatively nonvolatile liquid. The drying procedure itself is not critical, and can be carried out in ordinary drying equipment for granular materials, such as a gas fired rotary dryer. As indicated previously, where the base sugar is in a crystal form which can be changed by overdrying, it may be preferred to terminate the drying with a small residual content of free moisture, such as 0.5 to 1 percent free water by weight. For example, MAMS granules composed substantially entirely of dextrose monohydrate and having a moisture content of approximately 0.5 percent by weight can be impregnated with a water carrier up to a free moisture content of at least 4 percent by weight, then subsequently dried back to a moisture content of 0.5 percent by weight, and the cycle repeated as often as necessary until the desired content of the modifier is incorporated.

MAMS granules composed of alpha dextrose monohydrate will contain about 8 to 9 percent by weight water of crystallization. By drying under suitable conditions part or all of the water of crystallization can be driven off to form anhydrous alpha dextrose, or a mixture of monohydrate and anhydrous dextrose, without disrupting the granular structure. Such granules can be used where it is desired to add more than 4 to 5 percent water per impregnation cycle. For example, if the dextrose granules contain from 0 to 6 percent water of crystallization, the total amount which can be added is increased to the range of 8 to 14 percent. Part of the added water will be taken up as water of crystallization. Anhydrous or partially anhydrous alpha dextrose MAMS granules are also more absorptive for organic solvents, permitting a larger amount to be impregnated per cycle. In general, as much as 10 to 12 percent by weight of an organic solvent carrier can be applied without causing packing or caking of the granules.

Depending on the application to be made of the impregnated granules, various organic solvents can be used. However, for food or medical applications, a nontoxic, edible organic solvent is desirable, such as ethanol, glycerol, propylene glycol, or mixtures of such solvents. For example, a mixture of ethanol and propylene glycol can be used as an impregnating solvent.

After completing the impregnation, part or all of the carrier solvent may be removed by evaporation: As an alternative to drying the granules after impregnation, the impregnated granules can be packaged in suitable sealed containers, which are capable of substantially preventing the evaporation of the solvent. Even if the granules are substantially fully saturated with the solvent, it has been found that the granules remain free-flowing when packaged in this manner, and the loss of volatile substances can be avoided. This procedure is particularly suitable for adding volatile essences, such as flavoring oils, to the MAMS granules.

In another procedure, the impregnated granules are subjected to a second treatment in which a pore closure material is applied. For example, the pore closure material can comprise a vegetable oil or fat, or a hydrocarbon or synthetic wax. The coating material can be sprayed on to the granules while they continue to be agitated and intermixed in the same apparatus as used for the spray mixing, the application of the coating material being continued at least until the coating on the exterior surface of the granules closes the outer ends of the capillary passages. Among the other water-insoluble materials which can be used are shellac, rosin, and paraffin. Where desired, the coating material can be dissolved in or thinned with a volatile organic solvent, and the solvent evaporated as the coating is formed. The coating can be effective where it substantially retards the release or loss of the impregnated substance and/or carrier solvent by reduction of porosity of the surface layers.

The coating material can be soluble or dispersible in water, and applied as an aqueous solution or dispersion. For example, water solutions or dispersions of vegetable gums can be used, including Agar, Carrogeenan, Alginates, Guar Gum, Gum Acacia and Gum Tragacanth, gelatin, pectin, starches and dextrins, malto-dextrin and like polysaccharides, carboxymethyl cellulose and sodium caseinate. Other pore closure materials include methyl cellulose, polyethylene glycols, hydroxypropylcellulose, polyvinyl pyrrolidone, ethyl cellulose and zein. Most of these coating materials can be applied as aqueous solutions or dispersions, although some of the materials can be used in a mixed water and organic solvent solution. For example, zein can be dissolved in a mixture of water and ethanol or water and isopropanol, and applied as a coating material.

Certain porosity reducing materials can be applied in the liquid phase and then allowed to harden. These include paraffins and hydrogenated triglyceride fats. For example, normally solid hydrogenated vegetable oils can be heated and applied as a liquid, and then cooled on the surface of the granules to form a sealing layer. In still another procedure, a water solution of a crystallizable sugar, such as a concentrated sugar syrup is applied, and the sugar is crystallized within the capillary passages of the granules. This reduces porosity although complete sealing is not usually obtained.

In a desirable embodiment of the present invention, the MAMS granules are prepared from a starch hydrolysate composed of dextrose and oligosaccharides and having a D.E. of at least 94 up to about 98. For this material, the basic granule structure is primarily microcrystalline alpha dextrose monohydrate with oligosaccharides, being in the form of a solid solution. Although the oligosaccharides comprise only a few percent of the total sugar content of the granules, the solid solution apparently acts as an auxiliary binder or cementing agent, and thereby assists in maintaining the structural integrity of the granules during the processing step of the method of this application. In other embodiments, however, it will be understood that the MAMS granules can be formed substantially entirely of dextrose, such as dextrose granules having a D.E. of 98.0 or higher, or the granules can be formed of other sugars, such as sucrose, fructose, maltose, lactose, xylose, mannitol, etc.

This invention is further illustrated by the following numbered examples in which the starting material (unless otherwise stated) is Spray-Drier Aggregated granules prepared as described in copending application Ser. No. 674,168. The granules are composed of alpha dextrose monohydrate crystals with a few percent of oligosaccharides. The D.E. of the granules is about 95–96, and they contain approximately 9.0 percent water by weight, less than 0.5 percent being free water. The "SDA Sucrose" of the examples is also prepared by the process of said application Ser. No. 674,168.

EXAMPLE 1

The absorptive property of the SDA Total Sugar granules is illustrated by the following:
a. 3600 g. of SDA Total Sugar granules (9 percent water content) was placed in a laboratory Twin Shell Blender (Model LB–2990 of Patterson-Kelly Mfg. Co., Stroudsburg, Pa.) equipped with a combination liquid feed and intensifier bar. Four 100 ml. portions (127 g. each) of a red mixed fruit juice concentrate (60 percent D.S.) were added with a 20 minute mixing period (intensifier bar disengaged) following each addition. The product may have a damp appearance but it was not sticky and its flow properties were such that it could be readily transferred or otherwise handled. After an additional 2-hour aging period it became dry to the touch and completely free-flowing. It dried readily on exposure to the air to give a readily soluble product suitable as a fruit juice drink when mixed with water. A microscopic examination showed the fruit juice solids to be distributed uniformly throughout the interior of the granules.
b. In a test for comparative purposes, 3600 g. of crystalline hydrated dextrose was place in the blender and 100 ml. increments of the juice concentrate were added as above. After the first 100 ml. addition the sugar had a wet appearance and its free-flowing nature was noticeably reduced. After the second 100 ml. addition the sugar became so wet it stuck to the blender walls and was so non-free-flowing that it could not be effectively mixed. The test was terminated and the contents had to be largely removed by hand from the blender. It was difficult to handle and dry and the dried product was lumpy and hygroscopic. The added fruit juice solids was entirely on the crystal surfaces.

EXAMPLE 2

The absorbtive properties of the SDA granules is illustrated by the following example in which their behavior is compared with that of conventional crystalline dextrose when intermixed with propylene glycol which was selected as representative of a nonvolatile fluid additive. A solution of ethanol and propylene glycol having a 2:1 volume ratio was prepared and colored with a red dye to facilitate migration studies.
a. To 8 pounds of SDA total sugar granules in a laboratory model Twin Shell Blender (Model LB–2990 of Patterson Kelly Mfg. Co.) equipped with a combination liquid feed and intensifier bar was added 100 ml. increments of the above alcohol-glycol mixture. After each addition the blender was operated for 10–15 minutes with the intensifier bar disengaged. No change was noted in the free-flowing properties of the mixture until the fifth addition (500 ml.) when it became slightly less free-flowing and started to show signs of agglomeration. After the seventh addition (700 ml.—approx. 14.6 percent weight gain of solution or 6.2 percent weight gain of propylene glycol) the mass appeared damp but, even after ageing in a closed container, remained quite free-flowing. On removal of the alcohol by air drying, its free-flowing properties improved and the granules were uniformly colored by the dye.
b. The above procedure was repeated using ordinary crystalline dextrose in place of the SDA sugar granules. The first 100 ml. addition of the alcohol-glycol mixture resulted in a marked reduction of the free-flowing properties of the sugar. The second 100 ml. addition reduced it even more so that the mass appeared very damp and tumbled en-masse. After the sixth 100 ml. addition the mass was unworkable and had to be removed from the blender by hand. When aged in closed containers it appeared wet and adhered to the container walls. When air dried the material tended to cake and migration of the nonvolatile propylene oxide was observed in each case as evidenced by the formation of nonuniform colored layers in the samples.

EXAMPLE 3

One part of calcium cyclamate and six parts of citric acid is dissolved in six parts of an aqueous imitation raspberry flavor. The mixture is then thoroughly mixed into 80 parts of an SDA total sugar. The damp mixture is then dried in a circulating air stream to give a uniform, nonagglomerated, free-flowing granular product. Two teaspoons of the material will dissolve readily when stirred in a glass of water to produce a pleasant flavored beverage.

EXAMPLE 4

Ten parts of twofold orange oil (containing 0.02 percent BHT stabilizer) is mixed with 0.1 part emulsifier (Tween-20) and the mixture is emulsified on 20 parts of water. The emulsion is then uniformly distributed on 400 parts of SDA total sugar granules which have been vacuum oven dried to a total moisture content of 1.5 percent. The emulsion will be absorbed almost immediately, giving a free-flowing dry product suitable as an orange flavored dusting sugar for bakery goods or confectionery.

EXAMPLE 5

The orange flavored sugar of example 4 is placed in the bowl of a Hobart blender and to it was slowly added with medium agitation a solution of 24 g. of malto-dextrin in 36 g. of water (made by heating them together and cooling to 80° F.) The material may acquire a damp feel, but should not be sticky and should be readily transported and handled without difficulty. After air drying it will resume its original completely free-flowing, readily soluble nature. The malto-dextrin will partially seal the surface openings of the granules so that the orange oil in the granule interiors has a decreased tendency to volatilize or oxidize. In examples 4 and 5, the drying necessary after impregnation and coating is minimized due to the fact that the water added was removed, in part, in converting the anhydrous dextrose to the hydrated form.

EXAMPLE 6

Twenty parts of gum arabic is suspended in 40 parts of water and heated with agitation to give a viscous, uniform mixture which is then cooled. Twenty parts of twofold cold pressed, stabilized orange oil is then added to the vegetable gum solution and emulsified with vigorous agitation. The emulsion is then distributed on and intermixed with 400 parts of SDA total sugar granules which had been partially dehydrated by heating (2 percent total moisture). The resulting damp mixture is slightly agglomerated, but can be readily handled and when air dried will give a free-flowing product, the granules of which will be somewhat larger than those of the original SDA granules. They are readily soluble, have a good flavor stability, and are suitable as a dry flavoring ingredient in beverage powders, cake mixes, etc.

EXAMPLE 7

Four hundred parts of SDA total sugar granules which have been previously dried to a total moisture content of 2.0 percent are impregnated with one part of oil of cinnamon using an alcohol solution thereof. The mixture is intimately mixed with 108 parts of a 66 percent solution of sucrose in water. The added water will be rapidly absorbed in converting the anhydrous dextrose to the hydrated form and the mixture will soon attain a dry appearance and a free-flowing nature. On a dry basis it can contain about 16.5 percent sucrose, which will not only contribute to the sweetness of the product, but, by partially obstructing the surface openings of the individual SDA granules will minimize the loss on ageing of the volatile constituents of the oil. The product produced is suitable as a cinnamon flavored sugar for use in baked goods, on toast, etc.

EXAMPLE 8

Twenty parts of citric acid is dissolved in 20 parts of an aqueous cherry flavor which is then uniformly distributed on and thoroughly mixed into 400 parts of SDA total sugar. The resulting mixture may have a damp feel, but can be handled and conveyed, etc. without difficulty. It is readily air dried to give a free-flowing granular product with about 9 to 9.2 percent total water content. A solution of 40 parts sucrose in 20 parts water is then distributed on and intermixed with this product to again give a damp, easily handled material which again is readily dried to give a free-flowing granular product. A second addition of sucrose solution is similarly made and the product dried as before to give a free-flowing, readily soluble granular product suitable as a beverage base. The approximately 16 percent sucrose content contributes to the sweetness of the product and its location predominately on the granule surfaces has an inhibiting effect on the volatilization of the flavor components.

EXAMPLE 9

To partially dehydrated SDA total sugar granules (containing a mixture of anhydrous and hydrated dextrose) having a total water content of 4.0 percent is added to 5.5 parts of a dilute solution of phenobarbital sodium. After thorough mixing, the water added is absorbed in converting the anhydrous dextrose to the hydrated form and the resulting granules will be free-flowing and uniformly impregnated with the additive. No additional drying is necessary. The product is suitable for use in filling unit dosage gelatin capsules. Depending upon the sugar quantity used per capsule, the strength of the original solution can be varied to give the unit medicine dosage desired.

EXAMPLE 10

Equal parts of single-fold California lemon oil and ethyl alcohol are thoroughly mixed so that the oil is partially dissolved and partially emulsified. The mixture is then added to 18 parts of SDA total sugar (partially anhydrous with a total water content of 2 percent) and thoroughly mixed in a Hobart mixer during which process the alcohol partially evaporated. The product will be completely free-flowing, have a dry appearance and feel, and will be readily soluble. It is suitable as a flavored sugar for use as a food additive.

EXAMPLE 11

Ten parts of a starch dextrin is cooked in 15 parts of water. The paste is cooled to 100° F. and then thoroughly blended into 100 parts of the lemon oil impregnated sugar prepared in example 10 above, and the mixture is air dried. The free-flowing product is readily soluble and the dextrin deposited primarily on the surface and in the surface openings of the granules will inhibit the oxidation and volatilization of the flavor ingredients.

EXAMPLE 12

One part of single-fold vanilla extract (40 percent ethanol) is distributed on and thoroughly mixed into nine parts of SDA total sugar which had been dried to the partially anhydrous state (total water content = 4.0 percent). The water in the extract is absorbed in converting the anhydrous dextrose to the hydrated form and the mixture will be uniformly impregnated and free-flowing. It is suitable as a vanilla sugar for use in foods.

EXAMPLE 13

To 8 pounds of vanilla sugar (prepared by the process of example 12 above) in the Patterson Kelly Twin Shell Blender is added 50 ml. increments of a hydrogenated vegetable oil (m.p. 100° F., density 0.88 g./ml.) which has been liquefied by heating to 125° F. The addition is by means of the liquid feed bar and agitation is continued for 10–15 minutes after each addition with the intensifier bar disengaged. The oil solidified after penetrating the granules.

After five incremental additions (approx. 6.0 percent oil added on the sugar basis) the mixture will be still free-flowing enough to handle and convey without difficulty. The oil film will be distributed uniformly on the granule surfaces, and is effective in inhibiting the loss of flavor from the impregnant on ageing.

EXAMPLE 14

One part of oil of cinnamon bark is dissolved in 20 parts of ethanol and uniformly distributed on and intermixed with 400 parts of SDA sucrose having a total moisture content of about 0.2 percent. The resulting mixture will have a dry appearance, be completely free-flowing, and be readily water soluble. It is suitable as a flavoring material in the preparation of confectionery and other foods and as a flavored sugar for use in baked goods, cinnamon-toast, etc.

EXAMPLE 15

The suitability of the SDA granules as a carrier for a variety of pharmaceutical or industrial additives is illustrated by the following: four parts of 1-menthol is dissolved in three parts of ethanol and the solution is distributed on and thoroughly intermixed with a bed of nine parts of SDA total sugar granules having a total moisture content of about 9.1 percent. The alcohol is then removed by evaporation in an air stream. The product will contain 10 percent menthol uniformly distributed through the granules and will be readily water-soluble and completely free-flowing.

Many uses of the method and products of this invention will be apparent. Emulsions of oils (fruit, perfume, expectorant, spice, and oleoresin) for use as stable condiments and flavorings, air fresheners, dry cough medicines, and other medicinals impregnated into the MAMS granules should have commercial value. A particular case is in the area of medicinals where the taste of the medicament is unpleasant, or where it is desired that the medicament be ingested in the intestinal or stomach walls. In the latter case, the impregnated sugar can so function, when coated with an enteric substance to give a sustained release medicament. Water solutions of acids, bases, salts, water-soluble medicinals, food dyes, flavors, artificial sweeteners and sugars, etc., can be used as impregnating agents to impart to the sugar a host of specialized applications in the areas of food (imitation fruit drinks, dry confectionery mixes, frosting) and medicinals (anti-acid tablets, oral vaccines) as well as other food and nonfood areas. The area of alcohol soluble materials encompasses a wide range of commercially desirable items which could be made more convenient by impregnating various materials into the SDA or MAMS granules. Incorporation of dyes, perfumes, flavor extracts, elixirs and other alcohol soluble medicaments, spice oils, oleoresins, etc. into the porous microcrystalline aggregates will give rise to a wide variety of useful products. Free-flowing textile dyes prepared by this method could eliminate the mess of thy usual liquid or finely powdered dyes; impregnation of perfumes could result in a sustained release air freshener; impregnation of cordial or liquer flavors could be useful in dry cocktail mixes; and impregnation of fruit flavor and essences, meat flavors, spice oils and oleoresins could be used in the making and processing of cakes, cookies, puddings, frosting, gravies, soups, etc.

While in the foregoing specification this invention has been described in relation to certain preferred embodiments thereof, and many details have been set forth for purpose of illustration rather than limitation, it will be appreciated that the method of this invention is applicable to additional embodiments than those described herein, and that many of the details set forth in the specification can be varied considerably without departing from the basic principles of the invention.

We claim:

1. The method of preparing an intimate mixture of starch hydrolysate sugar with an impregnating additive, comprising providing a free-flowing bed of granules composed essentially of cohered dextrose microcrystals and oligosaccharides in solid solution, said granules being porous with internal capillary networks, having been aggregated from a microcrystalline massecuite of a starch hydrolysate total sugar with a D.E. of at least 92 percent, the granules of said bed initially having a free water content of less than 1 percent by weight, applying to said bed an aqueous carrier containing an impregnating additive, while agitating and intermixing the granules of said bed to promote the absorption of said carrier by said granules, said bed being maintained in essentially free-flowing condition during said absorption, and terminating the application of said carrier before said granules contain as much as 5 percent free water by weight.

2. The method of claim 1 in which the dextrose microcrystals of said granules at the beginning of said application are at least partially in anhydrous form.

3. The method of claim 1 in which said granules at the beginning of said application contain from 0 to 6 percent by weight water of crystallization.

4. The method of claim 1 in which said carrier is composed substantially entirely of water and said granules at the beginning of said application contain from 0 to 6 percent by weight water of crystallization in the dextrose hydrate portion of said microcrystals, said granules on the completion of said application having the dextrose microcrystals thereof substantially entirely in their hydrated form and containing not over 4 percent by weight free water.

5. The method of claim 1 in which said carrier is composed substantially entirely of water and said granules at the beginning of said application contain not over 8 to 9 percent by weight water, said granules on the completion of said application containing at least 4 to 5 percent added water.

6. The method of claim 1 wherein said granules after absorption of said carrier are treated with a sealing material, said sealing material being effective to at least partially close the outer ends of said capillary passages.

7. The product produced by the method of claim 6.

8. The method of claim 1 wherein said impregnating additive is a water-soluble normally solid substance, and said granules after absorption of said carrier are subjected to drying to remove water while leaving said additive within said granules.

9. The product produced by the method of claim 8.

10. The method of claim 8 wherein after said drying step the granules thus obtained are subjected to at least one additional cycle, including a carrier application step and a drying step.

11. The method of preparing an intimate mixture of starch hydrolysate sugar with an impregnating additive, comprising providing a free-flowing bed of granules composed essentially of cohered dextrose microcrystals and oligosaccharides in solid solution, said granules being porous with internal capillary networks, having been aggregated from a microcrystalline massecuite of a starch hydrolysate total sugar with D.E. of at least 92 percent, the granules of said bed initially having a free water content of less than 1 percent by weight, applying to said bed a nontoxic edible organic solvent carrier containing an impregnating additive, while agitating and intermixing the granules of said bed to promote the absorption of said carrier by said granules, said bed being maintained in essentially free-flowing condition during said absorption, and the application of said carrier being terminated before said granules begin to pack or cake.

12. The method of claim 11 wherein said granules after absorption of said carrier are treated with a sealing material, said sealing material being effective to at least partially close the outer ends of said capillary passages.

13. The method of claim 11 in which the dextrose microcrystals of said granules at the beginning of said application are at least partially in anhydrous form.

14. The method of claim 11 wherein said impregnating additive is a normally solid substance dissolved in said carrier, and said granules after absorption of said carrier are subjected to drying to remove said carrier while leaving said additive within said granules.

15. The method of claim 14 wherein after said drying step the granules thus obtained are subjected to at least one additional cycle, including a carrier application step and a drying step.

* * * * *